United States Patent
Tsunoda (10) Patent No.: US 7,171,607 B2
(45) Date of Patent: Jan. 30, 2007

(54) APPARATUS AND METHOD FOR VERIFYING ERASURE CORRECTION FUNCTION

(75) Inventor: Masahiko Tsunoda, Hachioji (JP)

(73) Assignee: Kabushiki Kaisha Toshiba, Tokyo (JP)

(*) Notice: Subject to any disclaimer, the term of this patent is extended or adjusted under 35 U.S.C. 154(b) by 581 days.

(21) Appl. No.: 10/743,551

(22) Filed: Dec. 23, 2003

(65) Prior Publication Data

US 2004/0168102 A1 Aug. 26, 2004

(30) Foreign Application Priority Data

Dec. 27, 2002 (JP) ............ 2002-382258

(51) Int. Cl.
*G11C 29/00* (2006.01)
*H03M 13/00* (2006.01)

(52) U.S. Cl. .................. 714/765; 714/746

(58) Field of Classification Search ........ 714/763, 714/765, 769, 746

See application file for complete search history.

(56) References Cited

U.S. PATENT DOCUMENTS

| 5,701,314 A | 12/1997 | Armstrong et al. ....... 714/765 |
|---|---|---|
| 6,119,261 A | 9/2000 | Dang et al. ............ 714/769 |
| 6,282,610 B1 | 8/2001 | Bergsten ............... 711/114 |
| 6,697,989 B1* | 2/2004 | Maeda et al. ........... 714/755 |
| 7,055,082 B2* | 5/2006 | Mori et al. ............ 714/768 |

FOREIGN PATENT DOCUMENTS

| GB | 2 314 450 A | 12/1997 |
|---|---|---|
| JP | 2000-195009 | 7/2000 |

OTHER PUBLICATIONS

Austrian Search and Examination Reports, dated Jun. 4, 2004 for Patent Application No. 200307411-9.

* cited by examiner

*Primary Examiner*—Shelly Chase
(74) *Attorney, Agent, or Firm*—Pillsbury Winthrop Shaw Pittman LLP (57) ABSTRACT

When a special write command from a host is executed, switching is performed so that the data designated by the command will not be input to an ECC generator. In accordance with an erasure pointer setting command from the host, a programmable erasure pointer generator sets, in an erasure pointer memory, a special erasure pointer that indicates, as an error location, the location designated by the setting command. This pointer is used for erasure correction performed when the data written to a disk by the execution of the special write command is read in accordance with a normal read command.

15 Claims, 8 Drawing Sheets

APPARATUS AND METHOD FOR VERIFYING ERASURE CORRECTION FUNCTION

CROSS-REFERENCE TO RELATED APPLICATIONS

This application is based upon and claims the benefit of priority from the prior Japanese Patent Application No. 2002-382258, filed Dec. 27, 2002, the entire contents of which are incorporated herein by reference.

BACKGROUND OF THE INVENTION

1. Field of the Invention

The present invention relates to an apparatus and method for verify an erasure correction function, i.e., a function for correcting an error in the data reproduced from a recording medium, using pointer information indicative of the location of the error and an error correcting code attached to the data.

2. Description of the Related Art

In recent magnetic disk drives, errors in the data read from a disk and decoded are often corrected by the combination of random correction and erasure correction, as disclosed in U.S. Pat. No. 6,119,261 (hereinafter referred to as a "prior art document"). This document describes a technique for detecting an error location in data, and re-executing error correction using the information indicative of the error location, if random correction fails. The information indicating the error location is pointer information called an erasure pointer.

The random correction function incorporated in magnetic disk drives can be tested by the disk drives, using long commands. The long commands are mainly classified into a write long command for instructing writing of data to a disk, and a read long command for instructing reading of data from the disk. The write long command is used to directly write, to a disk, the data (one-sector data) designated by a host. When the write long command is executed, the operation of an ECC generator to generate error correction code (ECC) data is suppressed. ECC data is redundant data used to detect errors from data and correct them. The read long command is used to directly store the data (one-sector data), read from a disk, into a read data buffer without error correction. When the read long command is executed, the operation of an error correction circuit for correcting an error in read data is suppressed.

The inspection of the random correction function is realized by verify whether a random correction circuit is correctly operating, as will now be described. When a host has issued a read long command to a magnetic disk drive, the magnetic disk drive executes the command. As a result, data containing ECC data is read from a disk. The data read from the disk is decoded by a read/write channel, and then stored in a read data buffer without error correction. Part of the data stored in the read data buffer is intentionally broken (rewritten). The partially broken data is copied into a write data buffer, and written to the disk. After that, the operation of reading the partially broken data from the disk is performed in accordance with a normal read command. If the random correction circuit correctly operates, the partially broken data has to be appropriately corrected. Therefore, whether the random correction circuit is correctly operating can be detected by checking whether partially broken data has been appropriately corrected.

As described above, in the prior art, whether the random correction circuit is correctly operating can be verified using a long command. On the other hand, whether the erasure correction circuit is correctly operating cannot be verified without pointer information. In conventional magnetic disk drives, pointer information is output depending upon the read/write channel. Accordingly, unless data that satisfies the pointer generation condition in the read/write channel is read from a disk, the operation of the erasure correction circuit cannot be verified. Moreover, to output pointer information of high reproducibility from the read/write channel, the data read from a disk must contain a clear defect. There is even a case where data reading, for example, is repeated to compile pointer information, thereby estimating the correct pointer position. Thus, conventional magnetic disk drives, which perform error correction using the combination of random correction and erasure correction, do not have the same type function of verify the erasure correction function (i.e., the erasure correction verifying function) as the function of verifying the random correction function using long commands.

BRIEF SUMMARY OF THE INVENTION

According to an embodiment of the invention, there is provided a storage controller for controlling, in accordance with a read/write command from a host, reading of data from a recording medium or writing of data to the recording medium, and transfer of read data or write data to or from the host. The storage controller comprises an error correction code generator, erasure pointer memory, error correction circuit, inhibition circuit and programmable erasure pointer generator. The error correction code generator generates an error correction code in accordance with data to be written to the recording medium, the error correction code being attached to the data. The erasure pointer memory stores pointer information indicative of a location at which an error exists, the error being contained in data read from the recording medium. The error correction circuit corrects the error in the data, read from the recording medium, by erasure correction and random correction, using the error correction code attached to the data and the pointer information stored in the erasure pointer memory. The inhibition circuit inhibits the error correction code generator from attaching the error correction code to data to be written to the recording medium, when a special write command from the host is executed. The programmable erasure pointer generator sets, in the erasure pointer memory, special pointer information indicating a location as an error location, in accordance with an erasure pointer setting command from the host, the location being designated by the erasure pointer setting command. The special pointer information set in the erasure pointer memory is used by the error correction circuit to correct an error in data written to the recording medium by executing the special write command, and read therefrom in accordance with a normal read command from the host.

DETAILED DESCRIPTION OF THE INVENTION

Figure 1:
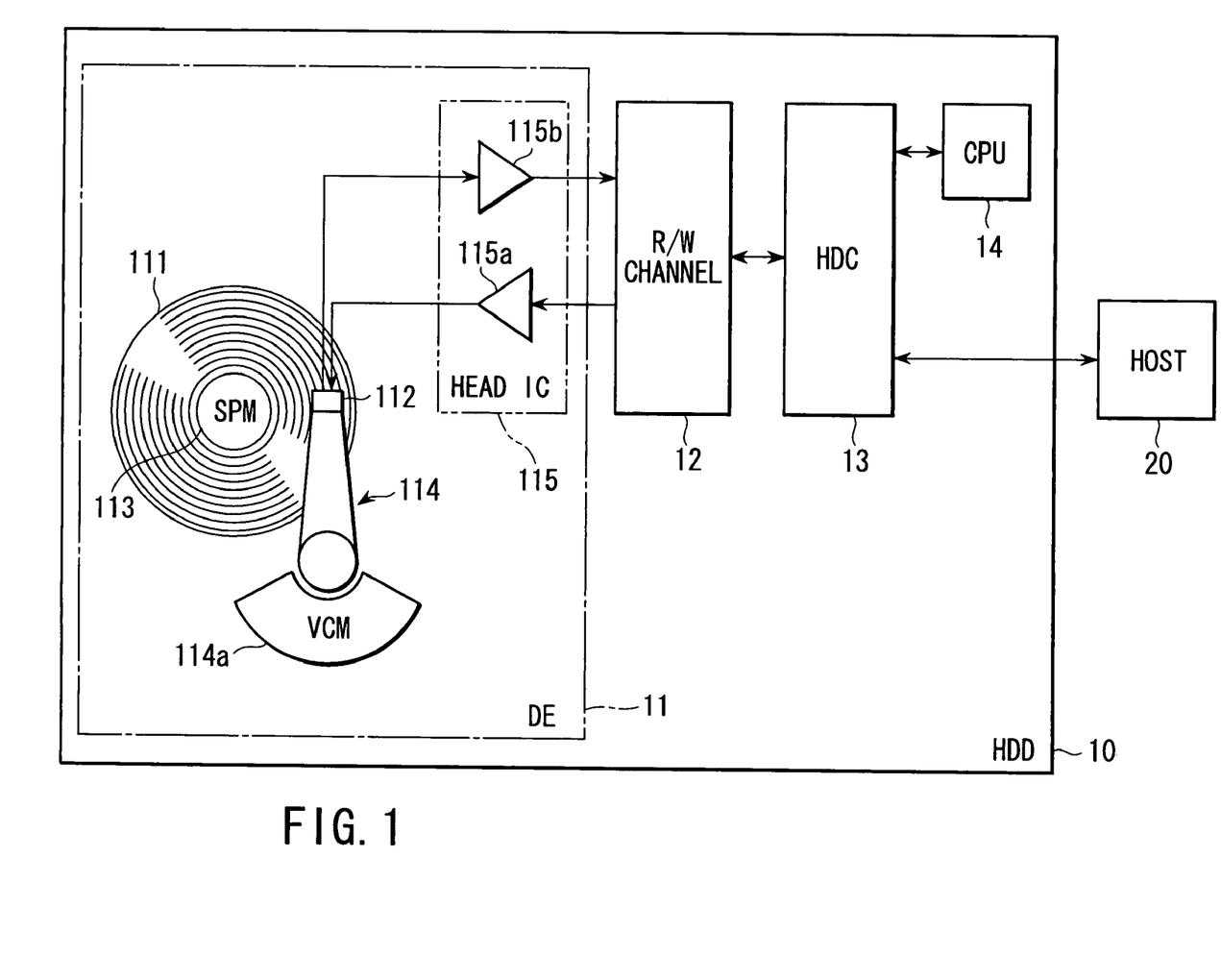
FIG. 1 is a block diagram illustrating the configuration of a magnetic disk drive according to an embodiment of the invention.

An embodiment of the invention will be described in detail with reference to the accompanying drawings. FIG. 1 is a block diagram illustrating the configuration of a magnetic disk drive 10 according to an embodiment of the invention. As seen from FIG. 1, the magnetic disk drive (hereinafter referred to as an "HDD") 10 mainly comprises a disk enclosure (hereinafter referred to as a "DE") 11, read/write channel (hereinafter referred to as an "R/W channel") 12, hard disk controller (hereinafter referred to as an "HDC") 13 and CPU 14. The DE 11 is connected to the R/W channel 12, and performs reception of a write signal (record signal) and transmission of a read signal (reproduction signal). The DE 11 comprises a disk (magnetic disk medium) 111 for recording data, and head (magnetic head) 112. The disk 111 has two disk surfaces, i.e., the upper and lower ones. At least one of the disk surfaces of the disk 111 forms a recording surface for magnetically recording data. The head 112 is located corresponding to the recording surface of the disk 111. The head 112 writes (records) data to the disk 111 and reads (reproduces) data therefrom. The head 112 is a composite head formed of a read head and write head (none of which is shown). The read head is a magnetoresistive head (MR head) formed of, for example, a magnetoresistive (MR) element. The write head is an inductive head formed of an inductive thin-film element. The DE 11 further comprises a spindle motor (hereinafter referred to as an "SPM") 113 for rotating the disk 111, actuator 114 and head IC (integrated circuit) 115. The actuator 114 supports the head 112 and radially moves it over the disk 111. The actuator 114 comprises a voice coil motor (hereinafter referred to as a "VCM") 114a as its driving source. The head IC 115 comprises a write amplifier 115a for amplifying a write signal supplied from the R/W channel 12, and a read amplifier 115b for amplifying a read signal read by the head 112. In the HDD 10 shown in FIG. 1, for simplifying the description, it is assumed that a single disk 111 is provided, and the head 112 is located on one side of the disk 111. However, a plurality of disks 111 may be stacked on one another. Further, each surface of the disk 111 may be a recording surface, and respective heads 112 may be provided for the recording surfaces.

The R/W channel 12 is a signal-processing device for executing various signal processes, such as a process for subjecting a read signal to analog-to-digital (A/D) conversion, a process for encoding write data, and a process for decoding a digitized read signal. The HDC 13 is a storage controller connected to the R/W channel 12, CPU 14 and host (host system) 20. The host 20 is a digital device, such as a personal computer, which uses the HDD 10. The HDC 13 has a host interface function for receiving a command (such as, a write command, read command, etc.) from the host 20, and controlling the transfer of data to and from the host 20. The HDC 13 also has a disk control function for controlling the transfer of data to and from the disk 111 via the R/W channel 12. The HDC 13 further has ECC data processing function for generating ECC data that is to be attached to the data (write data) to be written to the disk 111, and correcting an error in the data read from the disk 111, using the ECC data attached thereto. Error correction is performed by the combination of random correction and erasure correction. The CPU 14 is the main controller in the HDD 10. The CPU 14 controls the DE 11, R/W channel 12 and HDC 13 in accordance with the control program stored in a read-only memory (ROM), not shown. The CPU 14 performs control for verifying the erasure correction function of the HDD 10 in accordance with an instruction from the host 20, in particular.

Figure 2:
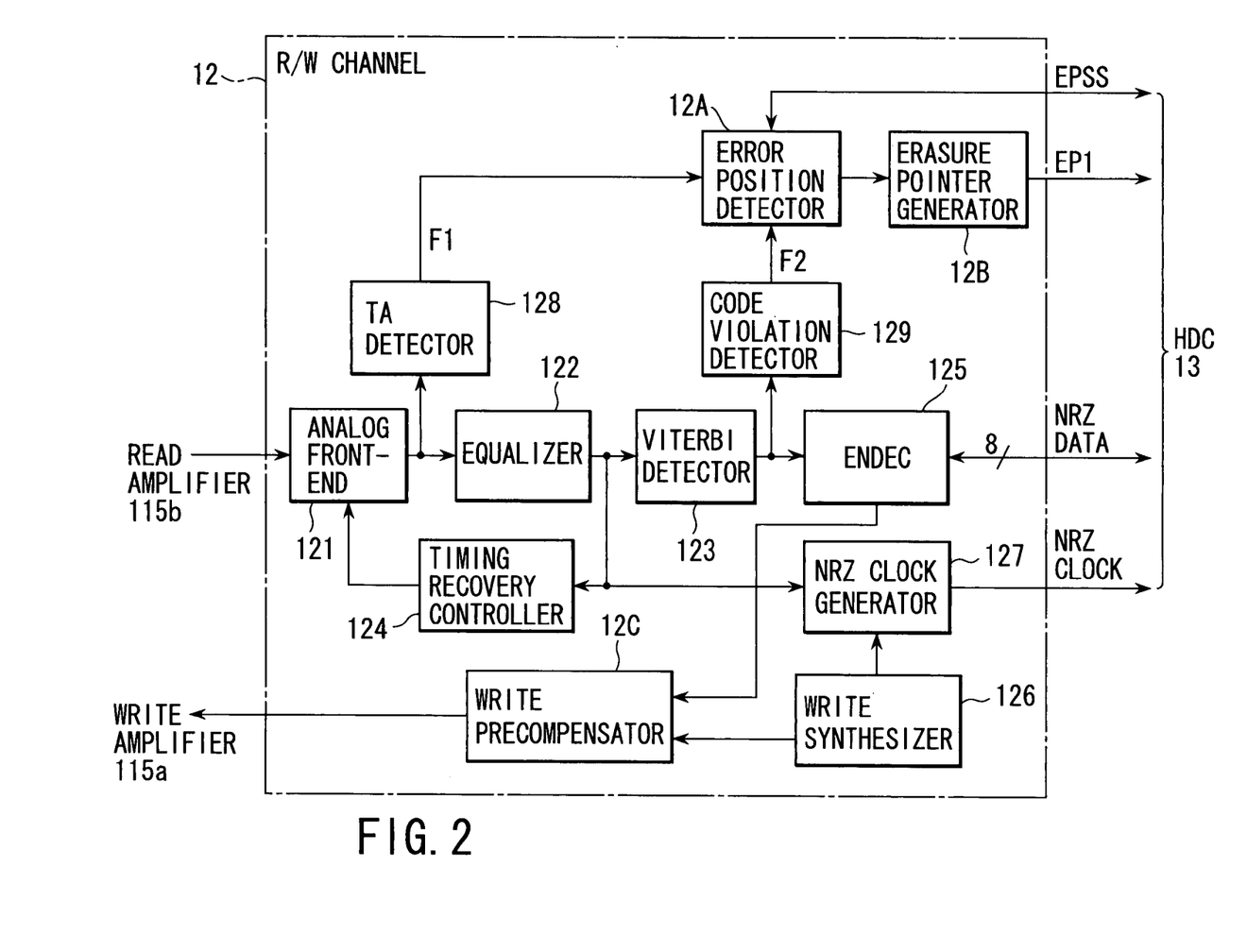
FIG. 2 is a block diagram illustrating the configuration of the R/W channel 12 appearing in FIG. 1.

FIG. 2 shows the configuration of the R/W channel 12. The R/W channel 12 comprises an analog front-end 121, equalizer 122, Viterbi decoder 123 and timing recovery controller 124. The analog front-end 121 has a variable gain amplifier (VGA), analog filter and analog-to-digital converter (none of which is shown). The sampling clock (read clock) of the analog-to-digital converter is synchronized with the clock (channel clock) of the data written in the disk 111 by the timing recovery controller 124.

The R/W channel 12 further comprises an encoder/decoder (hereinafter referred to as an "ENDEC") 125, write synthesizer 126, an NRZ clock generator 127, thermal asperity detector (hereinafter referred to as a "TA detector") 128 and code violation detector 129. The ENDEC 125 converts the data decoded by the Viterbi decoder 123 into NRZ (non-return to zero) data. The resultant NRZ data is transferred as read data to the HDC 13. The ENDEC 125 code-converts the write data (NRZ data) transferred from the HDC 13, and converts it into NRZI (non-return to zero inverse) data. In the code conversion, for example, each data item of 32 bits (four bytes) is converted into 34-bit data. The write synthesizer 126 mainly generates a base clock needed for generating a write clock. The write synthesizer 126 can vary the frequency of the basic clock. The NRZ clock generator 127 generates an NRZ clock corresponding to NRZ data, based on the basic clock from the write synthesizer 126 and the output of the equalizer 122. The NZR clock is transferred to the HDC 13. The TA detector 128 monitors the output level of the analog front-end 121 to detect the occurrence of thermal asperity (hereinafter referred to "TA"). TA means the phenomenon caused by the thermal energy that occurs due to the collision of the head 112 and the surface of the disk 111. In the phenomenon, the magnetic resistance of the MR head (MR element) is changed to thereby significantly change the DC level of a read signal. The TA detector 128 compares the output level of the analog front-end 121 with a preset threshold value. If the output level of the analog front-end 121 exceeds the preset threshold value, the TA detector 128 determines that TA has occurred, and outputs a flag (TA flag) F1 that shows "1" only when TA is occurring. The code violation detector 129 detects a code-violating binary sequence in units of a predetermined block size (in units of 34 bits in this case), from the binary sequence input from the Viterbi decoder 123 to the ENDEC 125. The code-violating binary sequence is a specific pattern that is predetermined to be an error and that has, for example, all bits set to "1". The code violation detector 129 outputs a flag (code violation flag) F2 that shows "1" only during the period corresponding to the detected code-violating binary sequence.

The R/W channel 12 further comprises an error location detector 12A and erasure pointer generator 12B. The error location detector 12A detects an error location in read data needed for generating an erasure pointer, in accordance with the TA flag F1 from the TA detector 128, the code violation flag F2 from the code violation detector 129, and an erasure pointer selection signal EPSS from the HDC 13. More specifically, the error location means the region ranging from an error start location to an error end location. The erasure pointer selection signal EPSS designates whether the error location should be detected based on only the flag F1, only the flag F2, the logical sum of the flags F1 and F2, or the logical multiplication of the flags F1 and F2. The erasure pointer generator 12B generates an erasure pointer EP1 that indicates the error location detected by the error location detector 12A. The erasure pointer EP1 is pointer information that indicates the locations of errors in data corresponding to one sector, in a kind of bitmap in units of, for example, bytes. In the embodiment, only the bits assume "1" which are included in the bits constituting the erasure pointer EP1, and correspond to the bytes included in the error location (the region ranging from an error start location to an error end location) detected by the error location detector 12A. The DE 11 also comprises a write pre-compensator 12C. The write pre-compensator 12C corrects the recording waveform timing for the NRZI data output from the ENDEC 125. The data obtained after the timing correction is output as write data to the write amplifier 115a of the head IC 115.

Figure 3:
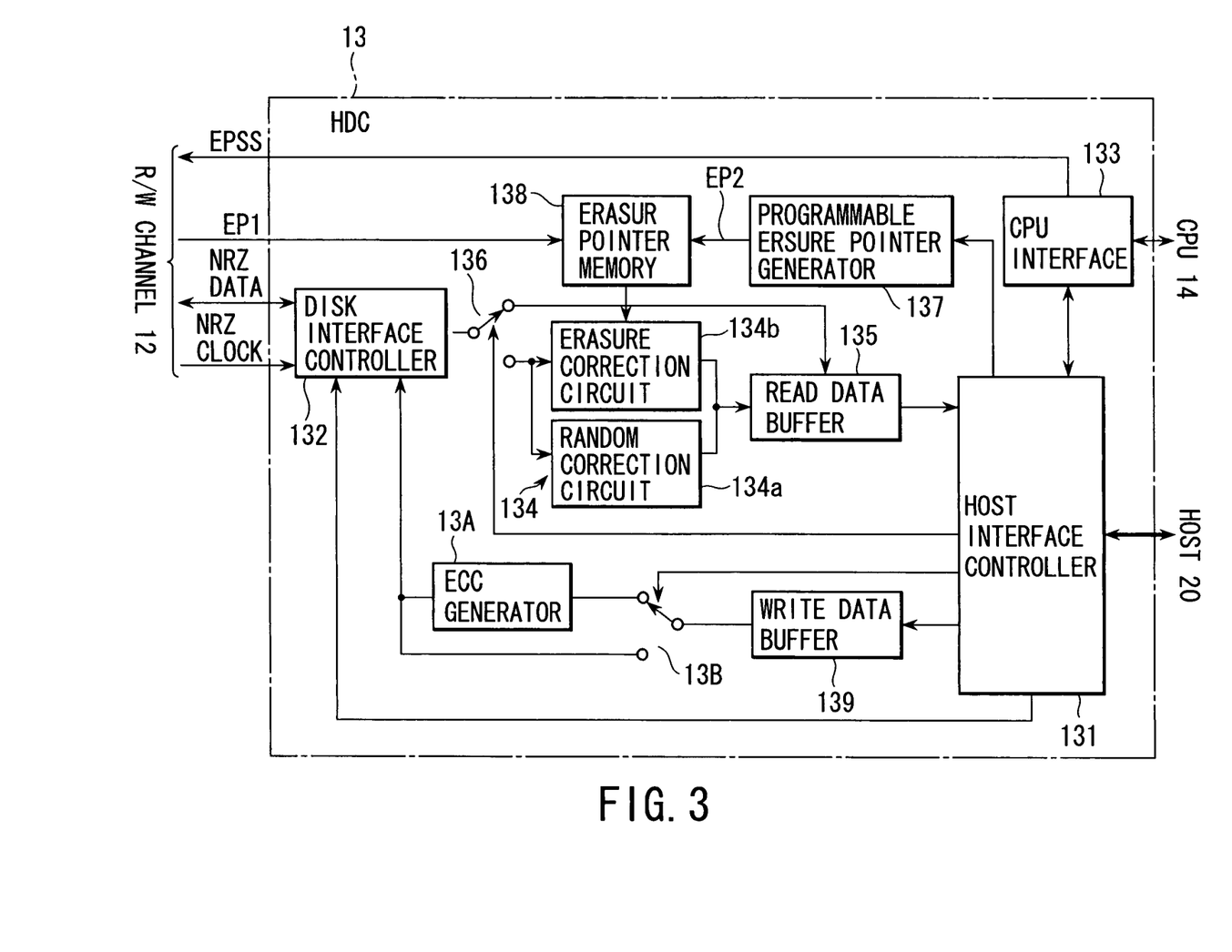
FIG. 3 is a block diagram illustrating the configuration of the HDC 13 appearing in FIG. 1.

FIG. 3 illustrates the configuration of the HDC 13. The HDC 13 comprises a host interface controller 131, disk interface controller 132 and CPU interface 133. The host interface controller 131 has the above-mentioned host interface control function. The disk interface controller 132 has the above-mentioned disk interface control function. The CPU interface 133 serves as an interface with the CPU 14. The erasure pointer selection signal EPSS is supplied from the HDC 13 to the R/W channel 12 when the CPU 14 sets a certain bit to, for example, "1" in a control register (not shown) via the CPU interface 133.

The HDC 13 also comprises an error correction circuit 134. The error correction circuit 134 corrects an error contained in the NRZ data (read data) transferred thereto from the R/W channel 12 via the disk interface controller 134, using the ECC data attached to the data. The error correction circuit 134 comprises a random correction circuit 134a and erasure correction circuit 134b. The random correction circuit 134a corrects the error of the NRZ data, using only the ECC data attached to the data. The erasure correction circuit 134b corrects the error of the NRZ data, using the ECC data attached to the data and an erasure pointer stored in an erasure pointer memory 138, described later. The error correction by the erasure correction circuit 134b is called erasure correction.

A description will now be given of error correction performed by the error correction circuit 134 using the erasure pointer. The error correction capacity of the ECC data is related to the number of bytes (the number of symbols) of the ECC data. In general, when the read Solomon (RS) code is used as the ECC data to perform error correction, ECC data of two bytes (symbols) is needed for correcting an error of one byte (symbol). One of the two bytes is used to specify the location of an error, and the other is used to correct the error. However, when the error location is known beforehand, if it is used as an erasure, errors corresponding to the number of bytes of ECC data (the number of redundant symbols) can be corrected at maximum. Accordingly, if the error location of data is appropriately detected, and location information indicative of the error location (error location information), i.e., its erasure pointer, is used, an error of one byte can be corrected using ECC data of one byte. In other words, erasure correction can be performed. An advantage example of the erasure correction will now be described with reference to FIG. 4.

Figure 4:
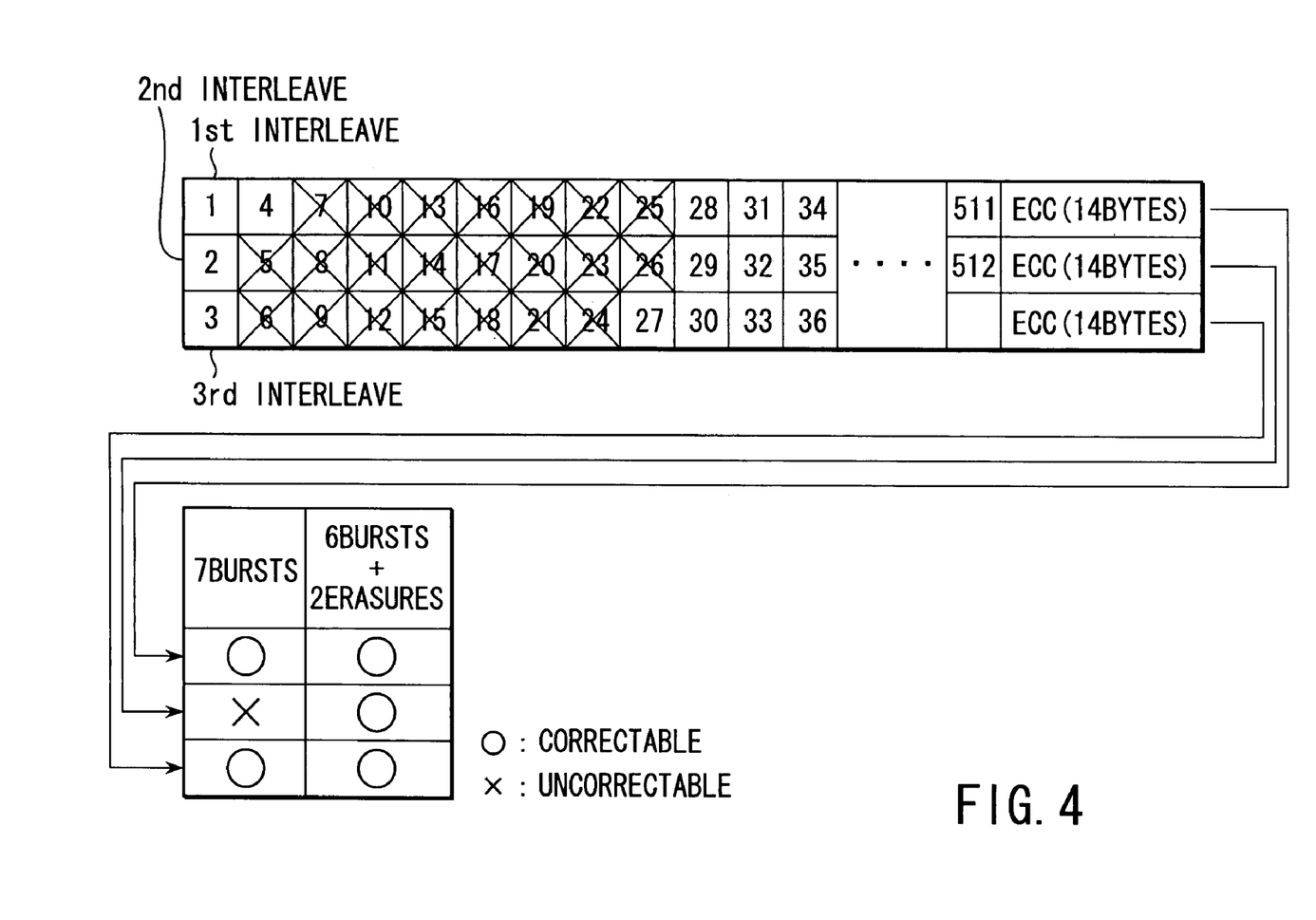
FIG. 4 is a view useful in explaining a specific example of an erasure correction effect.

FIG. 4 shows an example of "three interleaves (3i)×seven bursts (7b)". "Three interleaves (3i)×seven bursts (7b)" means that the number of interleaves of data (for example, one-sector data formed of 512 bytes ranging from the first byte to the 512th byte) is three, and random errors of seven bytes at maximum can be corrected for each interleave. In other words, "seven bursts" means that the maximum total burst length (i.e., the maximum random correction burst length) of data that can be corrected by random correction for each interleave, using an ECC, is seven. In this case, an ECC of 14 bytes is attached for each interleave. In the example of FIG. 4, assume that an error occurs in data of serial twenty-two bytes ranging from the fifth byte to the 26th byte, which are included in 512 bytes (one-sector data) and crossed. Since, in this case, an error of eight bytes occurs in the second one of the three interleaves, it cannot be corrected. Therefore, the "two erasures (two-bytes erasure correction)+six bursts" scheme is applied to the second interleave to enable the error correction circuit 134 to perform error correction. "Two erasures" means that an error of two bytes at maximum can be corrected using an ECC of two bytes and an erasure pointer of two bytes. In other words, "two erasures" means that the burst length (erasure correction burst length) of data that can be corrected by erasure correction is two. The application of the "two erasures+six bursts" scheme to the second interleave enables even an error of twenty-two serial bytes to be corrected.

Referring again to FIG. 3, the HDC 13 comprises a read data buffer 135 and switch 136. The read data buffer 135 temporarily stores read data in units of data sectors. Specifically, the read data buffer 135 stores the NRZ data transferred from the R/W channel 12 and obtained before error correction, or the NRZ data error-corrected by the random correction circuit 134a or erasure correction circuit 134b. The switch 136 switches the output destination of the NRZ data transferred from the R/W channel 12. In the normal state, the switch 136 switches the output destination of the NRZ data to the read data buffer 135. In a first specific state (first specific mode), the switch 136 switches the output destination of the NRZ data to the error correction circuit 134. When the host 20 has issued a read long command, the CPU 14 sets the first specific state via the host interface controller 131. The HDC 13 further comprises a programmable erasure pointer generator 137 and erasure pointer memory 138. The programmable erasure pointer generator 137 generates the erasure pointer EP2 designated by an erasure pointer setting command from the host 20. The erasure pointer memory 138 stores the erasure pointer EP1 or EP2. The erasure pointer EP1 or EP2 stored in the erasure pointer memory 138 is used for erasure correction performed by the erasure correction circuit 134b.

The HDC 13 yet further comprises a write data buffer 139, ECC generator 13A and switch 13B. The write data buffer 139 is held in a random access memory (RAM), together with the read data buffer 135. The write data buffer 139 temporarily stores, in units of data sectors, write data transferred from the host 20 via the host interface controller 131. The ECC generator 13A generates ECC data in units of data sectors based on the write data read from the write data buffer 139. The generated ECC data is attached to the write data, and the resultant write data is transferred to the R/W channel 12 via the disk interface controller 132. The switch 13B switches the output destination of the write data read from the write data buffer 139. In the normal state, the switch 136 switches the output destination of the write data to the ECC generator 13A. In a second specific state (second specific mode), the switch 13B switches the output destination of the write data to the disk interface controller 132. When the host 20 has issued a write long command, the host interface controller 131 sets the second specific state.

A description will be given of the operation of the embodiment performed, for example, to verify the erasure correction function of the erasure correction circuit 134b included in the error correction function of the error correction circuit 134. Referring first to the flowchart of FIG. 5, the process of selecting a data sector for verifying the error correction function will be described. In accordance with a command supplied from the host 20 to the HDD 10, the CPU 14 sets, to A1, the random correction burst length (random ECC length) used in the random correction circuit 134a of the HDC 13 (step 501). Subsequently, in accordance with a command from the host 20, the CPU 14 generates test data (NRZ data) corresponding to one sector, and stores it in the write data buffer 139 (step 502). After that, in accordance with a first seek command from the host 20, the CPU 14 executes seek control for moving the head 112 to a target track on the disk 111 (step 503). The first seek command contains a logical block address LBA1 for designating the target track. The logical block address LBA1 designates a target track T1 for the first test. Accordingly, the head 112 is moved to the track T1 by seek control at step 503. At step 503, the CPU 14 sets, to 1, the number BLK of blocks (sectors) to access.

Figure 5:
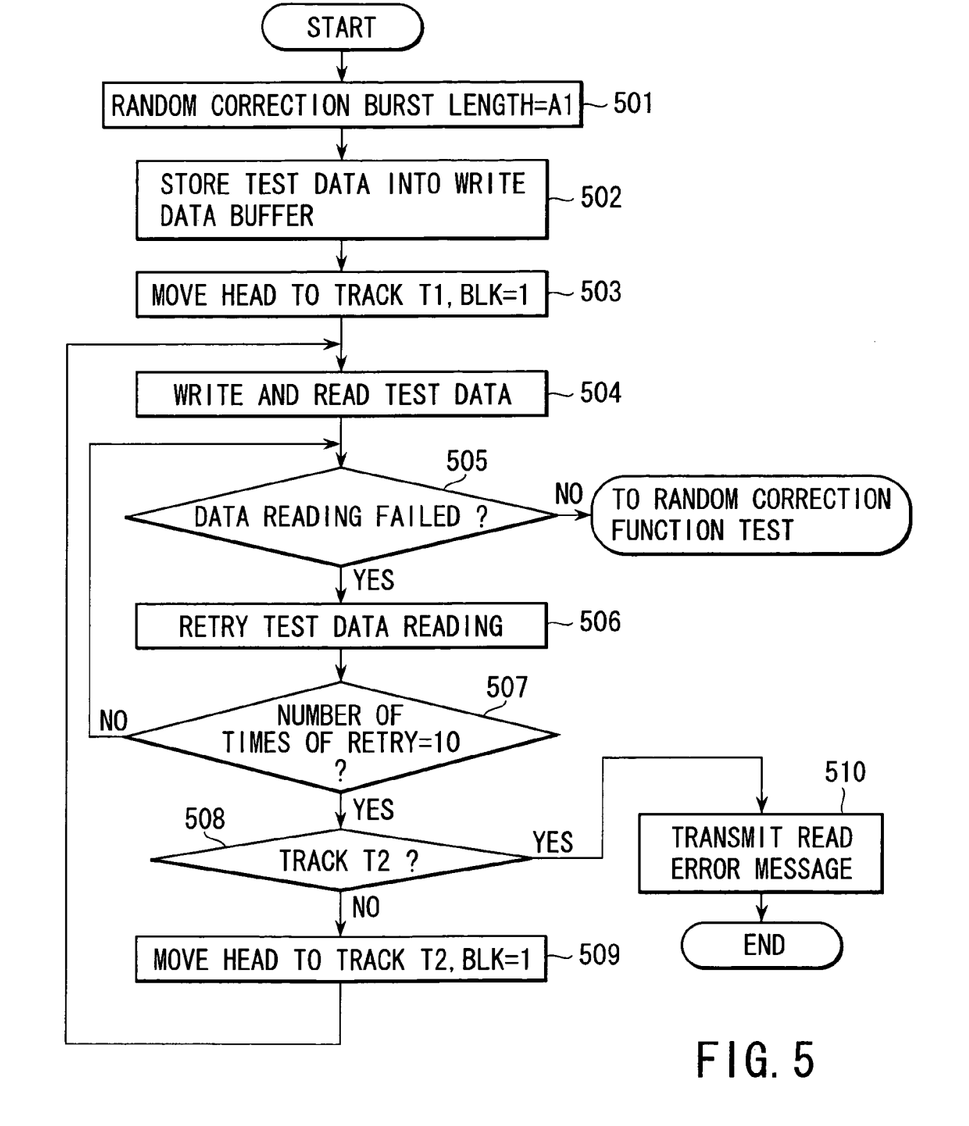
FIG. 5 is a flowchart illustrating the procedure of selecting a data sector used for verifying an error correction function.

In this state, the CPU 14 controls the writing of test data to the disk 111, and the reading of test data from the disk 111 (step 504). As a result, the following test data writing and reading are executed: Firstly, test data corresponding to one sector and stored in the write data buffer 139 is transferred to the ECC generator 13A via the switch 13B. The ECC generator 13A generates an ECC for each interleave based on the test data corresponding to one sector. The ECC generated for each interleave is attached to the test data. The test data with the ECC data corresponding to one sector is transferred from the HDC 13 to the R/W channel 12 via the disk interface controller 132. The R/W channel 12 converts each 32-bit data item of the test data (NRZ data) transferred from the HDC 13, into a 34-bit code. The R/W channel 12 also converts the resultant NRZ data into NRZI data. This NRZI data (with ECC data attached) is sent to the head 112 via the head IC 115, and written to the disk 111 by the head 112. The NRZI data is written to the data sector S1 on the track T1 designated by the LBA1.

The data written to the data sector S1 on the track T1 is read by the head 112. The thus-read data is transferred to the R/W channel 12 via the head IC 115. The R/W channel 12 converts the read data into NRZ data and then converts it into the original code. Further, the error location detector 12A of the R/W channel 12 detects the location of an error contained in the read data. The erasure pointer generator 12B generates an erasure pointer EP1 indicative of the detected error location. The erasure pointer EP1 is transferred to the HDC 13 together with the code-converted data (NRZ data). In the HDC 13, the erasure pointer EP1 is stored in the erasure pointer memory 138, and the NRZ data (read data) is input to the error correction circuit 134 via the disk interface controller 132 and switch 136. The erasure correction circuit 134b of the error correction circuit 134 corrects the error in the data by erasure correction, using the ECC data attached to the NRZ data input to the error correction circuit 134, and the erasure pointer stored in the erasure pointer memory 138. On the other hand, the random correction circuit 134a corrects, by random correction, an error that may exist at the locations not indicated by the erasure pointer. Thus, the error correction circuit 134 corrects an error in read data, using the combination of random correction and erasure correction. The error-corrected data is stored in the read data buffer 135.

If error correction by the error correction circuit 134 succeeds (step 505), i.e., if reading of data (test data) succeeds, the CPU 14 determines that the data sector used for the test data writing and reading is suitable for verifying the error correction function. In this case, the process for verifying the random correction function (random correction function test) is performed. If, on the other hand, error correction by the error correction circuit 134 fails (step 505), i.e., if the reading of data (test data) fails, the CPU 14 controls read retry, i.e., re-execution of the reading of the test data (more specifically, the reading of test data from the data sector S1 on the track T1) (step 506). This read retry (step 506) is repeated(step 507) until test data reading succeeds (step 505), but a number of times not more than a predetermined number of times (e.g. ten times).

If test data reading fails even after retry is repeated the predetermined number of times (step 507), the CPU 14 determines that the data sector used for writing and reading test data is inappropriate for the verification of the error correction function. At this time, the CPU 14 performs seek control for moving the head 112 from the track T1 to a track T2 (second target track to be tested) (step 509). Seek control is performed in accordance with a command (second seek command) supplied from the host 10 for the second test. The second seek command contains a logical block address LBA2 that designates a target track. Specifically, the logical block address LBA2 designates the track T2 as the second test target. After executing step 509, the CPU 14 returns to step 504. At step 504, test data is written to the data sector S2 on the track T2 designated by the address LBA2, and is read from the data sector S2. If the reading of the test data succeeds (step 505), a random correction function test is performed. On the other hand, if the reading of the test data from the data sector S2 (the second test) fails even after the retry operation is performed the predetermined number of times (step 508), the CPU 14 supplies the host 20 with an error message indicating a read error (step 510).

Figure 6:
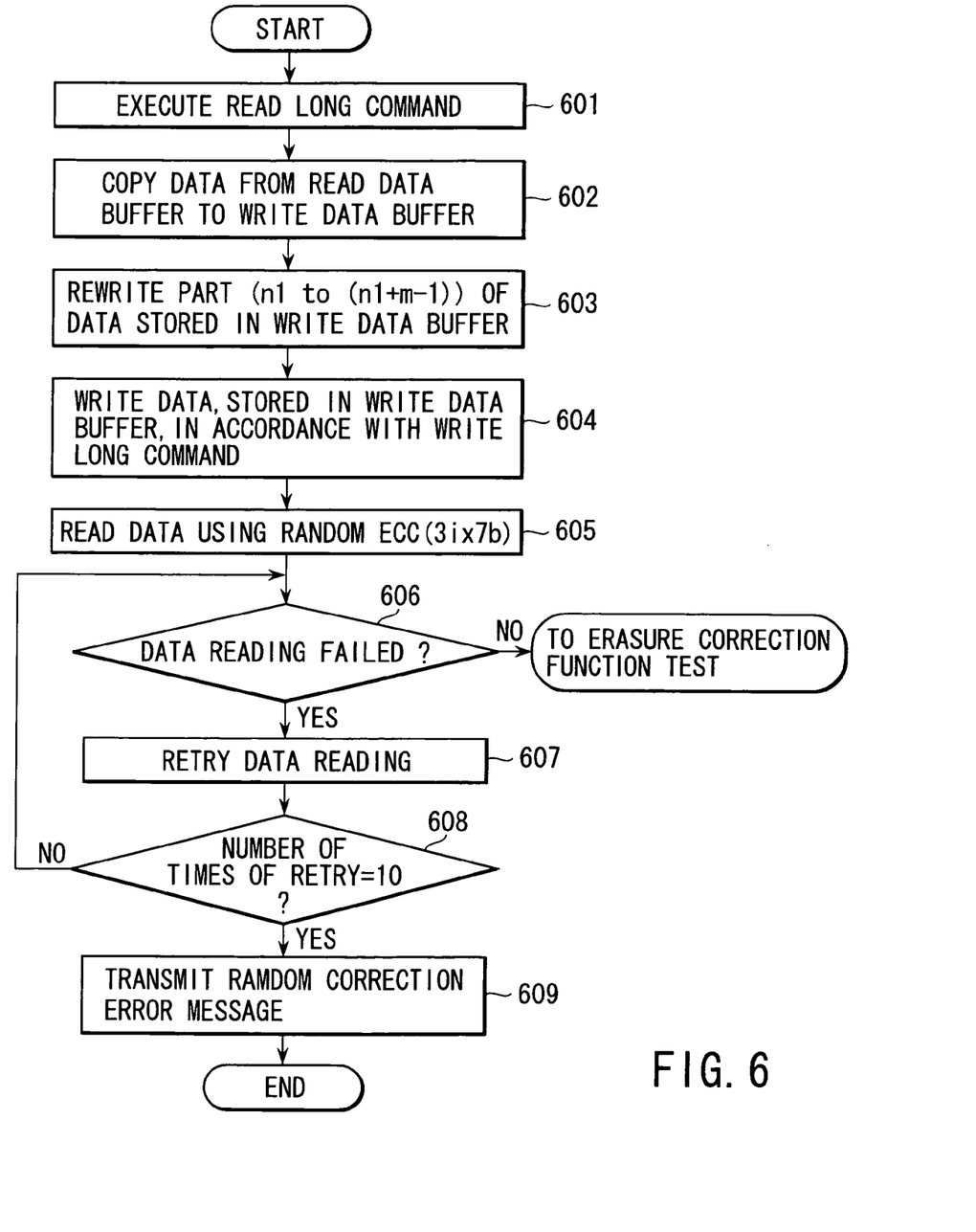
FIG. 6 is a flowchart illustrating the procedure of a random correction function test.

Referring to the flowchart of FIG. 6, the random correction function test will be described. If the host 20 succeeds in the reading of test data from a data sector Sk (k=1 or 2) on a track Tk, it issues a read long command to the HDD 10 in order to execute the random correction function test. The read long command is a special read command for dictating the reading of data from the data sector Sk on the track Tk without operating the error correction circuit 134. Upon receiving the read long command from the host 20, the CPU 13 in the HDD 10 executes the command (step 601). In other words, the CPU 14 controls the reading of data from the data sector Sk on the track Tk, dictated by the read long command. At this time, the HDD 10 is switched from the normal state to the first specific state (first specific mode) in accordance with the read long command. As a result, the switch 136 in the HDC 13 switches, from the error correction circuit 134 to the read data buffer 135, the output destination of the NRZ data transferred thereto from the R/W channel 12 via the disk interface controller 132. In this state, the data read from the data sector Sk on the track Tk is transferred to the HDC 13 via the head IC 115 and R/W channel 12. This data (read data), with ECC data attached thereto, is then stored in the read data buffer 135 via the disk interface controller 132 and switch 136.

Figure 8A:
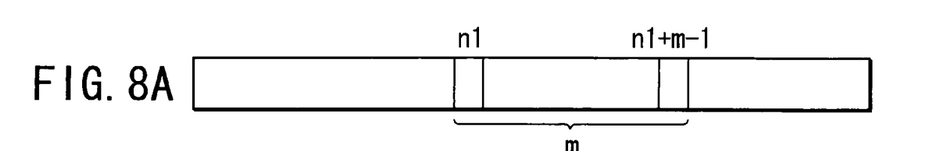
FIG. 8A illustrates a portion in which data is rewritten to generate data for the erasure correction function test.

After that, the host 20 issues a copy command to the HDD 10. The copy command dictates copying of data from the read data buffer 135 to the write data buffer 136. Upon receiving the copy command from the host 20, the CPU 14 in the HDD 10 copies the read data with the ECC data from the read data buffer 135 to the write data buffer 139 via the host interface controller 131 (step 602). Subsequently, the CPU 14 rewrites (breaks) part of the data copied to the write data buffer 139 (step 603). As seen from FIG. 8A, the to-be-rewritten portion of the copied data includes a number m of bytes ranging from the $n1^{th}$ byte to the $(n1+m-1)^{th}$ byte. The host 20 designates the to-be-rewritten portion. Here, "m" represents an arbitrary number that satisfies m≦(the number i of interleaves x correction burst length b). (The number i of interleaves x correction burst length b) represents the total number of bytes (symbols) that can be corrected by the random correction of the error correction circuit 134 (random correction circuit 134a). For example, if the number i of interleaves is 3 and the correction burst length b is 7 bytes, "m" is an integer that satisfies m≦3×7 (=21 bytes). In this case, assume that m=21. That the number i of interleaves is 3 may be expressed by "3i", and that the correction burst length b is seven bytes may be expressed by "7b". In the flowchart of FIG. 6, the order of steps 602 and 603 may be reversed. In other words, a number m of bytes ranging from the $n1^{th}$ byte to the $(n1+m-1)^{th}$ byte, contained in the read data stored in the read data buffer 135 may be rewritten, and the resultant data be copied to the write data buffer 139, with the ECC data attached to the data.

To verify whether the random correction function of the error correction circuit 134 is normal, it is sufficient if the following two processes are mainly performed. In a first process, the data in which a number m of bytes is rewritten (broken) is written to the disk 111 by executing a write long command. In a second process, to determine whether the partially broken data written to the disk 111 can be appropriately corrected, this data is read by executing a normal read command.

To this end, when part (i.e., the number m of bytes ranging from the $n1^{th}$ byte to the $(n1+m-1)^{th}$ byte) of the data copied to the write data buffer 139 has been rewritten, the host 20 supplies the HDD 10 with a write long command for writing the rewritten data to the disk 111. The write long command is a special write command for dictating the writing of data to the data sector Sk on the track Tk without operating the ECC generator 13A. Upon receiving the write long command from the host 20, the CPU 14 in the HDD 10 executes this command (step 604). Specifically, the CPU 14 controls the writing of the rewritten data, copied in the write data buffer 139, to the data sector Sk on the track Tk, dictated by the write long command. At this time, the HDD 10 is switched to the second specific state (second specific mode) in accordance with the write long command. Then, the switch 136 in the HDC 13 switches the output destination of the data (write data), stored in the write data buffer 139, to the disk interface controller 132. As a result, the data (write data) stored in the write data buffer 139, part (i.e., the number m of bytes ranging from the $n1^{th}$ byte to the $(n1+m-1)^{th}$ byte) of which is rewritten, is transferred, with the ECC data attached, to the disk interface controller 132 via the switch 13B. This data is further transferred from the disk interface controller 132 to the head 112 via the R/W channel 12 and head IC 115. The head 112 writes the data to the disk 111. In this example, the head 112 writes the data, in which the bytes ranging from the $n1^{th}$ byte to the $(n1+m-1)^{th}$ byte are rewritten, to the data sector Sk of the track Tk on the disk 111.

Subsequently, the host 20 supplies the HDD 10 with a normal read command for reading data from the data sector Sk of the track Tk. This command dictates random correction using "3i (three interleaves)×7b (seven bursts)". Upon receiving the normal read command from the host 20, the CPU 14 in the HDD 10 executes the command (step 605). Specifically, the CPU 14 controls the reading of data from the data sector Sk of the track Tk, dictated by the normal read command. At this time, the HDD 10 is switched to the normal state in accordance with the normal read command. Then, the switch 136 in the HDC 13 switches, to the error correction circuit 134, the output destination of the NRZ data (read data) transferred thereto from the R/W channel 12 via the disk interface controller 132. In this state, the data (read data) read from the data sector Sk of the track Tk is transferred to the HDC 13 via the head IC 115 and R/W channel 12. In the HDC 13, the data (read data) is input, with ECC data attached, to the error correction circuit 134 via the disk interface controller 132 and switch 136. In this example, the normal command dictates random correction using "3i (three interleaves)×7b (seven bursts)". Therefore, the random correction circuit 134a of the error correction circuit 134 corrects, by random correction, an error contained in the read data, using the ECC data attached to the read data (3i×7b ECC data, i.e., ECC data of 3×7 bytes). The error-corrected data is stored into the read data buffer 135.

If the error correction of the read data succeeds and data reading normally finishes (step 606), the CPU 14 determines that the random correction function of the error correction circuit 134 (random correction circuit 134a) is normal. In this case, a process (an erasure correction function test) for verifying the erasure correction function is performed next. On the other hand, if the error correction of the read data fails, i.e., if data reading fails (step 606), the CPU 14 controls the re-execution of the above-described data reading (i.e., read retry) (step 607). This read retry is repeated (step 607) until data reading succeeds (step 606), but a number of times not more than a predetermined number of times (e.g. ten times) (step 608).

If data reading fails even after retry is repeated the predetermined number of times (step 608), the CPU 14 determines that the random correction function of the error correction circuit 134 is not normally operating. At this time, the CPU 14 supplies the host 20 with a message indicative of a random correction error (step 609).

Figure 7A:
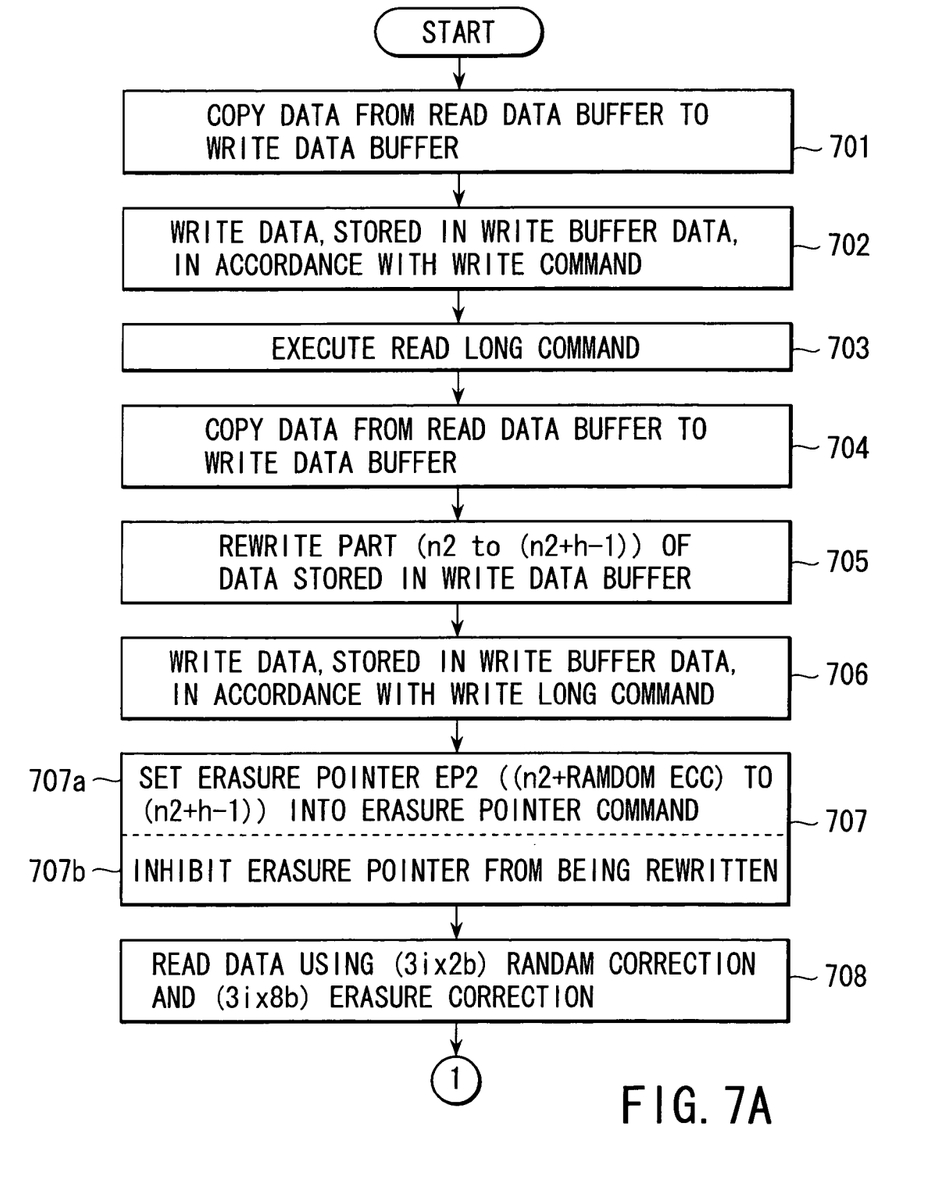
FIGS. 7A and 7B are flowcharts illustrating the procedure of an erasure correction function test.
Figure 7B:
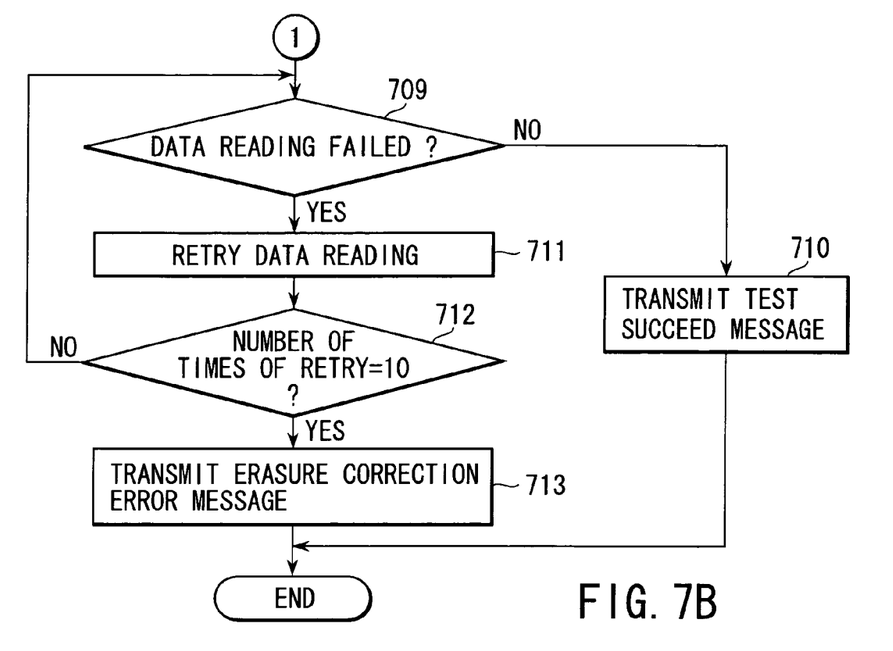

Referring then to the flowchart of FIGS. 7A and 7B, an erasure correction function test will be described. If it is determined from the random correction function test that the random correction function is normally operating, the host 20 issues a copy command to the HDD 10. The copy command dictates copying of data from the read data buffer 135 to the write data buffer 139. Upon receiving the copy command from the host 20, the CPU 14 in the HDD 10 copies data from the read data buffer 135 to the write data buffer 139 in accordance with the command (step 701). In this case, the error-corrected read data stored in the read data buffer 135 during the random correction function test is copied as write data into the write data buffer 139.

Subsequently, the host 20 supplies the HDD 10 with a normal write command for writing, to the disk 111, the data (one-sector data) copied in the write data buffer 139. Upon receiving the normal write command from the host 20, the CPU 14 in the HDD 10 executes the command (step 702). Specifically, the CPU 14 controls the writing of the one-sector data, copied in the write data buffer 139, to the data sector Sk on the track Tk, dictated by the normal write command. As a result, the one-sector data copied in the write data buffer 139 is transferred to the ECC generator 13A via the switch 13B. Based on this data, the ECC generator 13A generates an ECC for each interleave of the one-sector data. The ECC generated for each interleave is attached to the one-sector data. The one-sector data with the ECC data is supplied from the disk interface controller 132 to the head 112 via the R/W channel 12 and head IC 115, and is written by the head 112 to the disk 111. In this case, the data is written to the data sector Sk on the track Tk. In other words, the data, part of which is broken and which is written on the data sector Sk of the track Tk for the random correction function test, is rewritten into the original correct data.

After that, the host 20 issues a read long command to the HDD 10 in order to read the data written to the data sector Sk on the track Tk without operating the error correction circuit 134. Upon receiving the read long command from the host 20, the CPU 14 in the HDD 10 executes the command (step 703). Specifically, the CPU 14 controls the reading of data from the data sector Sk on the track Tk, dictated by the read long command. As a result, the data read from the data sector Sk on the track Tk is transferred to the HDC 13 via the head IC 115 and R/W channel 12. This data (read data), with ECC data attached thereto, is then stored into the read data buffer 135 via the disk interface controller 132 and switch 136.

Figure 8B:
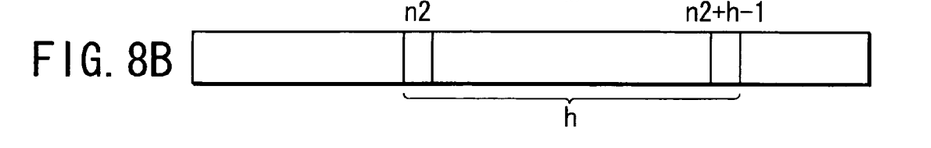
FIG. 8B illustrates portion in which data is rewritten to generate data for the erasure correction function test.

Subsequently, as at step 602, the CPU 14 copies the read data with the ECC data from the read data buffer 135 to the write data buffer 139 via the host interface controller 131 (step 704). This copy operation is dictated by a copy command issued from the host 20. Subsequently, as at step 603, the CPU 14 rewrites (breaks) part of the data copied to the write data buffer 139 (step 705). In this case, however, the to-be-rewritten portion of the copied data includes a number h of bytes ranging from the n2$^{th}$ byte to the (n2+h−1)$^{th}$ byte, as shown in FIG. 8B. The host 20 designates the to-be-rewritten portion. "h" represents an arbitrary number that satisfies h≦(random correction burst length+erasure correction burst length). The random correction burst length represents the total number of bytes (symbols) that can be corrected by the random correction of the random correction circuit 134a. In the embodiment, assume that the random correction burst length (random ECC length) is 3×2 (3i ×2b) (=6 bytes). On the other hand, the erasure correction burst length represents the total number of bytes (symbols) that can be corrected by the erasure correction of the erasure correction circuit 134b. In the embodiment, assume that the erasure correction burst length (erasure ECC length) is 3×8 (3i×8b) (=24 bytes) Therefore, "random correction burst length+erasure correction burst length" is 6+24=30 (bytes), and "h" is an integer that satisfies h≦30 (bytes). In the embodiment, assume that h=28 (bytes). In the embodiment in which the ECC for each interleave is of 14 bytes, if error correction is performed using only random correction, an error including series twenty-two bytes cannot be corrected as described with reference to FIG. 4. In light of this, it is advisable to set the lower limit of "h", i.e., to set "h" to a value falling within the range of 22 bytes to "random correction burst length+erasure correction burst length". This range enables the erasure correction function to be verified efficiently. The order of steps 704 and 705 may be reversed. In other words, a number h of bytes ranging from the n2$^{th}$ byte to the (n2+h−1)$^{th}$ byte, contained in the read data stored in the read data buffer 135 may be rewritten, and the resultant data be copied to the write data buffer 139, with the ECC data attached to the data.

To verify whether the erasure correction function of the error correction circuit 134 is normal, it is sufficient if the following three processes are mainly performed. In a first process, the data in which a number h of bytes is rewritten (broken) is written to the disk 111 by executing a write long command. In a second process, an erasure pointer EP2 for designating an error location corresponding to the data-rewritten position is set into the erasure pointer memory 138 in accordance with an outer command. In a third process, to determine whether the partially broken data written to the disk 111 can be appropriately corrected, this data is read by executing a normal read command.

To this end, when part (i.e., the number h of bytes ranging from the n2$^{th}$ byte to the (n2+h−1)$^{th}$ byte) of the data copied to the write data buffer 139 has been rewritten, the host 20 supplies the HDD 10 with a write long command for writing the rewritten data to the disk 111. Upon receiving the write long command from the host 20, the CPU 14 in the HDD 10 executes this command (step 706). As a result, the data (write data) stored in the write data buffer 139, part (i.e., the number h of bytes ranging from the n2$^{th}$ byte to the (n2+h−1)$^{th}$ byte) of which is rewritten, is transferred, with the ECC data attached, to the disk interface controller 132 via the switch 13B. This data is further transferred from the disk interface controller 132 to the head 112 via the R/W channel 12 and head IC 115. The head 112 writes the data to the disk 111. In the embodiment, the head 112 writes the data, in which the bytes ranging from the n2$^{th}$ byte to the (n2+h−1)$^{th}$ byte are rewritten, to the data sector Sk of the track Tk on the disk 111.

Figure 8C:
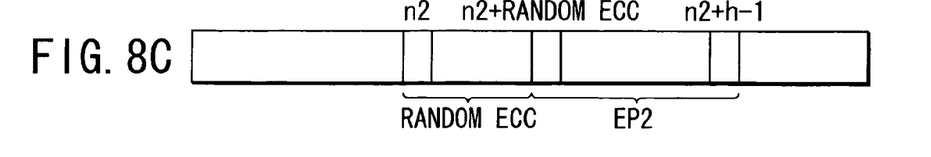
FIG. 8C illustrates the error location designated by an erasure pointer EP2 generated for the erasure correction function test.

Subsequently, the host 20 supplies the HDD 10 with an erasure pointer setting command for storing the erasure pointer EP2 into the erasure pointer memory 138 in the HDD 10. Upon receiving the erasure pointer setting command from the host 20, the CPU 14 in the HDD 10 executes this command (step 707). Specifically, the CPU 14 controls the programmable erasure pointer generator 137 via the host interface controller 131, thereby generating the erasure pointer EP2 designated by the erasure pointer setting command (step 707a). The programmable erasure pointer generator 137 stores the generated erasure pointer EP2 into the erasure pointer memory 138. The generated erasure pointer EP2 designates, as an error location, the location corresponding to the rewritten bytes ranging from the n2$^{th}$ byte to the (n2+h−1)$^{th}$ byte. For example, as shown in FIG. 8C, the generated erasure pointer EP2 designates, as an error location, the location corresponding to the bytes in one-sector data ranging from (n2+random correction burst length) to the (n2+h−1)$^{th}$ byte (in this case, the random correction burst length=3i×2b=6; "h"=28). This erasure pointer EP2 designates, as the error location, the portion of the rewritten bytes ranging from the n2$^{th}$ byte to the (n2+h−1)$^{th}$ byte, except for the bytes ranging from the n2$^{th}$ byte to (n2+random correction burst length−1), which correspond to the random correction burst length (random ECC data). Once the programmable erasure pointer generator 137 has stored the erasure pointer EP2 into the erasure pointer memory 138, it inhibits the contents of the memory 138 from being rewritten by the erasure pointer EP1 from the R/W channel 12 (step 707b). This inhibition state is released when the erasure correction function test finishes.

Thereafter, the host 20 supplies the HDD 10 with a normal read command for reading data from the data sector Sk on the track Tk. This command dictates random correction using "3i (three interleaves)×2b (two bursts)", and erasure correction using "3i (three interleaves)×8b (eight bursts)". Upon receiving the normal read command from the host 20, the CPU 14 in the HDD 10 executes the command (step 708). Specifically, the CPU 14 controls the reading of data from the data sector Sk on the track Tk, dictated by the normal read command. As a result, data is read from the data sector Sk on the track Tk, and is transferred to the HDC 13 via the head IC 115 and R/W channel 12. The data (read data) transferred to the HDC 13 is input, with ECC data attached, to the error correction circuit 134 via the disk interface controller 132 and switch 136. In this embodiment, random correction using "3i×2b", and erasure correction using "3i×8b" are dictated by the normal read command. The erasure correction circuit 134b in the error correction circuit 134 corrects an error in the input data by erasure correction using the ECC data attached to the data and the erasure pointer EP2 stored in the erasure pointer memory 138. As mentioned above, the erasure pointer EP2 designates, as an error location, the bytes in one-sector data ranging from (n2+random correction burst length)th to the $(n2+h-1)^{th}$ byte. Accordingly, the erasure correction circuit 134b corrects an error in the error location by erasure correction. On the other hand, the random correction circuit 134a corrects, by random correction, an error that may exist at the locations not indicated by the erasure pointer EP2. For example, an error may exist in a leading data portion (i.e., the bytes ranging from the $n2^{th}$ byte to the $(n2+random correction burst length-1)^{th}$ byte) that is included in the rewritten ($n2^{th}$ to $(n2+h-1)^{th}$) bytes and has a length equal to the random correction burst length. Thus, the error correction circuit 134 corrects an error in read data, using the combination of random correction and erasure correction. The error-corrected data is stored into the read data buffer 135.

If error correction of the read data (i.e., the data in which the bytes ranging from the $n2^{th}$ byte to the $(n2+h-1)^{th}$ byte is intentionally rewritten) succeeds and reading normally finishes (step 709), the CPU 14 determines that both the random correction function of the random correction circuit 134a and the erasure correction function of the erasure correction circuit 134b are normal. At this time, the CPU 14 supplies the host 20 with a message that the random and erasure correction function tests of the HDD 10 have succeeded (step 710). If, on the other hand, error correction of the read data fails, i.e., if data reading fails (step 709), the CPU 14 controls re-execution of data reading (i.e., read retry) (step 711). This read retry (step 711) is repeated (step 712) until test data reading succeeds (step 709), but a number of times not more than a predetermined number of times (e.g. ten times).

If data reading fails even after the retry operation is performed the predetermined number of times (step 712), the CPU 14 determines that the erasure correction function of the error correction circuit 134 is not normally operating. In this case, the CPU 14 supplies the host 20 with a message indicative of an erasure correction error (step 713).

As described above, in the embodiment, data (first data), part of which is rewritten (broken) and to which ECC data generated from original data (second data) is attached, is written to the disk 111 in accordance with a write long command (special write command) from the host 20. In this case, since the operation of the ECC generator 13A is inhibited by the write long command, the first data with the ECC data is directly written to the disk 111. Accordingly, the broken portion of the first data has to be considered an error. In light of this, in the embodiment, an erasure pointer EP2 (special pointer information) that indicates, as an error location, the location corresponding to the broken portion of the first data is set in a programmable manner in the erasure pointer memory 138 in the HDC 13. In this state, if a normal read command is executed to read the first data from the disk 111, the error correction circuit 134 performs an operation for correcting the error of the first data based on the erasure pointer EP2 and ECC data attached to the data. If the error correction circuit 134 is normally operating, i.e., if the erasure correction function is normally operating, the above-described broken portion is appropriately corrected, thereby completing data reading based on the normal read command. Thus, whether the erasure correction function is normally operating can be detected simply by determining whether reading of the first data from the disk 111 has succeeded.

In the above-described embodiment, the invention is applied to a magnetic disk drive (HDD). However, the invention is also applicable to any type of storage device that can read data from or write data to a recording medium, such as optical disk drives, magneto-optical disk drives, magnetic tape devices, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage controller for controlling, in accordance with a read/write command from a host, reading of data from a recording medium or writing of data to the recording medium, and transfer of read data or write data to or from the host, comprising:
    an error correction code generator which generates an error correction code in accordance with data to be written to the recording medium, the error correction code being attached to the data;
    an erasure pointer memory which stores pointer information indicative of a location at which an error exists, the error being contained in data read from the recording medium;
    an error correction circuit which corrects the error in the data, read from the recording medium, by erasure correction and random correction, using the error correction code attached to the data and the pointer information stored in the erasure pointer memory;
    an inhibition circuit which inhibits the error correction code generator from attaching the error correction code to data to be written to the recording medium, when a special write command from the host is executed; and
    a programmable erasure pointer generator which sets, in the erasure pointer memory, special pointer information indicating a location as an error location, in accordance with an erasure pointer setting command from the host, the location being designated by the erasure pointer setting command, the special pointer information set in the erasure pointer memory being used by the error correction circuit to correct an error in data written to the recording medium by executing the special write command, and read therefrom in accordance with a normal read command from the host.

2. The storage controller according to claim 1, further comprising means for inhibiting the special pointer information, set in the erasure pointer memory in accordance with the erasure pointer setting command, from being rewritten when a later read command is executed.

3. The storage controller according to claim 1, wherein the inhibition circuit includes a switch which performs switching between a state in which the data, to be written to the recording medium, is input to the error correction code generator, and a state in which the data, to be written to the recording medium, bypasses the error correction code generator, the switch being switched to make the data, to be written to the recording medium, bypass the error correction code generator when the special write command is executed.

4. The storage controller according to claim 1, further comprising:
   a read data buffer which stores, in units of data sectors, the data read from the recording medium and having the error corrected by the error correction circuit;
   a write data buffer which stores, in units of data sectors, the data to be written to the recording medium; and
   a transfer circuit which transfers, to the read data buffer, the data read from the recording medium and having the error correction code attached thereto, without passing the data through the error correction circuit, when a special read command from the host is executed.

5. The storage controller according to claim 4, wherein the transfer circuit includes a switch which performs switching between a state in which the data, to be written to the recording medium, is input to the error correction code generator, and a state in which the data, to be written to the recording medium, bypasses the error correction code generator, the switch being switched to make the data, to be written to the recording medium, bypass the error correction code generator when the special write command is executed.

6. The storage controller according to claim 1, wherein:
   the inhibition circuit inhibits the error correction code generator from attaching the error correction code to first data when the special write command from the host dictates writing of the first data to the recording medium, the first data being used for verifying an erasure correction function, the first data being obtained by rewriting part of second data, the error correction code attached to the first data being based on the second data;
   the programmable erasure pointer generator sets the special pointer information in the erasure pointer memory when the erasure pointer setting command from the host dictates setting of the special pointer information, the special pointer information indicating, as the location of the error, a location corresponding to the rewritten part of the first data; and
   the error correction circuit corrects an error in the first data read from the recording medium, by erasure correction and random correction, using the error correction code attached to the first data and the special pointer information set in the erasure pointer memory, when a normal read command from the host dictates reading of the first data from the recording medium.

7. The storage controller according to claim 6, further comprising:
   a read data buffer which stores, in units of data sectors, the data read from the recording medium and having the error corrected by the error correction circuit;
   a write data buffer which stores, in units of data sectors, the data to be written to the recording medium;
   a transfer circuit which transfers, to the read data buffer, the data read from the recording medium and having the error correction code attached thereto, without passing the data through the error correction circuit, when a special read command from the host is executed;
   means for copying, to the write data buffer, the second data stored in the read data buffer and having the error correction code attached thereto, when the second data is read from the recording medium by executing the special read command from the host, and is stored into the read data buffer without being passed through the error correction circuit; and
   means for generating the first data, to be written to the recording medium, by rewriting part of the second data copied to the write data buffer.

8. The storage controller according to claim 6, further comprising:
   a read data buffer which stores, in units of data sectors, the data read from the recording medium and having the error corrected by the error correction circuit;
   a write data buffer which stores, in units of data sectors, the data to be written to the recording medium;
   a transfer circuit which transfers, to the read data buffer, the data read from the recording medium and having the error correction code attached thereto, without passing the data through the error correction circuit, when a special read command from the host is executed;
   means for rewriting part of the second data stored in the read data buffer, when the second data is read from the recording medium by executing the special read command from the host, and is stored into the read data buffer without being passed through the error correction circuit; and
   means for generating the first data, to be written to the recording medium, by copying the rewritten second data from the read data buffer to the write data buffer, the second data having the error correction code attached thereto.

9. A storage apparatus for generating an error correction code for data when the data is written to a recording medium, and correcting an error in the data when the data is read from the recording medium, the error being corrected using pointer information indicative of a location of the error and the error correction code attached to the data, the storage apparatus comprising:
   a signal processing device which subjects a read signal, read from the recording medium, to analog-to-digital conversion, encodes data to be written to the recording medium, and decodes digitized read data; and
   a storage controller which controls, in accordance with a read/write command from a host, reading of data from a recording medium or writing of data to the recording medium via the signal processing device, and transfer of read data or write data to or from the host, and
   wherein the storage controller includes:
   an error correction code generator which generates an error correction code in accordance with data to be written to the recording medium, the error correction code being attached to the data;
   an erasure pointer memory which stores pointer information indicative of a location at which an error exists, the error being contained in data read from the recording medium;
   an error correction circuit which corrects the error in the data, read from the recording medium, by erasure correction and random correction, using the error correction code attached to the data and the pointer information stored in the erasure pointer memory;

an inhibition circuit which inhibits the error correction code generator from attaching the error correction code to data to be written to the recording medium, when a special write command from the host is executed; and a programmable erasure pointer generator which sets, in the erasure pointer memory, special pointer information indicating a location as an error location, in accordance with an erasure pointer setting command from the host, the location being designated by the erasure pointer setting command, the special pointer information being used to read data, written to the recording medium by executing the special write command, in accordance with a normal read command from the host.

10. A method of verifying an erasure correction function incorporated in a storage apparatus, the erasure correction function being used to correct an error in data read from a recording medium, using pointer information indicative of a location of the error and an error correction code attached to the data, the method comprising:

preparing, in a write data buffer, first data to be written to the recording medium, the first data being obtained by rewriting part of second data, the first data having an error correction code generated based on the second data;

executing a special write command to write, to the recording medium, the first data prepared in the write data buffer and already having the error correction code, without generating another error correction code based on the first data;

setting special pointer information in an erasure pointer memory regardless of reading of data from the recording medium, the special pointer information indicating, as an error location, a location corresponding to the rewritten part of the first data;

reading the first data written to the recording medium by execution of the special write command; and determining whether the erasure correction function is normally operating, from a determination as to whether an error in the first data read from the recording medium is corrected by erasure correction and random correction using the error correction code attached to the first data and pointer information stored in the erasure pointer memory.

11. The method according to claim 10, further comprising inhibiting the special pointer information stored in the erasure pointer memory from being rewritten, and wherein the first data is read after the inhibiting.

12. The method according to claim 10, wherein the preparing the first data includes:

preparing the second data in the write data buffer with the error correction code attached, the error correction code being generated on a basis of the second data; and generating the first data by rewriting part of the second data prepared in the write data buffer.

13. The method according to claim 12, wherein the preparing the second data includes:

preparing the second data in the write data buffer with no error correction code attached;

executing a normal write command to write, to the recording medium, the second data with no error correction code prepared in the write data buffer;

executing a special read command to read, from the recording medium, the second data written to the recording medium by execution of the normal write command, and to store the second data into a read data buffer with the error correction code attached, the second data being written to the recording medium with the error correction code attached, the error correction code being generated on a basis of the second data; and copying the second data, stored into the read data buffer by the execution of the special read command, to the write data buffer with the error correction code attached.

14. The method according to claim 10, wherein a length of the part is not more than a sum of a data length which can be corrected by the erasure correction, and a data length which can be corrected by the random correction.

15. The method according to claim 14, wherein the special pointer information indicates, as an error location, a continuous data range included in the part and except for a burst length which can be corrected by random correction.

* * * * *